United States Patent
Trajkovic et al.

(10) Patent No.: US 8,950,676 B2
(45) Date of Patent: Feb. 10, 2015

(54) IMAGE CAPTURE BASED ON WORKING DISTANCE RANGE RESTRICTION IN IMAGING READER

(75) Inventors: Miroslav Trajkovic, Centereach, NY (US); Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 549 days.

(21) Appl. No.: 12/860,190

(22) Filed: Aug. 20, 2010

(65) Prior Publication Data
US 2012/0043385 A1 Feb. 23, 2012

(51) Int. Cl.
G06K 7/10 (2006.01)
G06K 9/24 (2006.01)

(52) U.S. Cl.
CPC .... *G06K 7/10811* (2013.01); *G06K 2207/1011* (2013.01)
USPC .............. 235/462.21; 235/462.11; 235/462.01

(58) Field of Classification Search
CPC ............ G06K 19/0614; G06K 9/6253; G06K 7/1417; G06K 9/228; G06K 19/06037; G06K 2009/2045; G06K 2209/05; G06K 2209/40; G06K 9/00664; G06K 9/00993; G06K 9/22; G06K 9/32; G06K 19/06028; G06K 19/0604
USPC ................ 235/462.01, 462.2, 462.21, 462.11
See application file for complete search history.

(56) References Cited

U.S. PATENT DOCUMENTS

| | | | |
|---|---|---|---|
| 4,613,895 A | 9/1986 | Burkey et al. | |
| 4,684,792 A | 8/1987 | Nickels | |
| 4,794,239 A | 12/1988 | Allais | |
| 5,311,969 A | 5/1994 | Dickover et al. | |
| 5,324,924 A | 6/1994 | Cai et al. | |
| 5,703,349 A | 12/1997 | Meyerson et al. | |
| 5,874,719 A | 2/1999 | Hippenmeyer et al. | |
| 6,021,944 A | 2/2000 | Arakaki | |
| 6,021,946 A | 2/2000 | Hippenmeyer et al. | |
| 6,276,606 B1 | 8/2001 | Liou et al. | |
| 7,097,104 B2 | 8/2006 | Silverbrook et al. | |
| 7,108,187 B2 | 9/2006 | Turvy, Jr. et al. | |

(Continued)

FOREIGN PATENT DOCUMENTS

| | | |
|---|---|---|
| WO | 2008027170 A2 | 3/2008 |
| WO | 2010053721 A1 | 5/2010 |

OTHER PUBLICATIONS

International Search Report and Written Opinion for International Application No. PCT/US2009/061829 mailed on Mar. 26, 2010.

(Continued)

*Primary Examiner* — Thien T Mai (57) ABSTRACT

An arrangement for, and a method of, electro-optically reading a target by image capture, employ an aiming assembly for projecting an aiming light pattern on the target that is located within a range of working distances relative to a housing, an imaging assembly for capturing an image of the target and of the aiming light pattern over a field of view, and for generating an electrical signal indicative of the captured image, and a controller for determining a distance of the target relative to the housing based on a position of the aiming light pattern in the captured image, and for processing the electrical signal into information relating to the target when the target lies in a restricted zone within the range of working distances.

17 Claims, 6 Drawing Sheets

(56) References Cited

U.S. PATENT DOCUMENTS

| | | |
|---|---|---|
| 7,303,131 B2 | 12/2007 | Carlson et al. |
| 7,347,371 B2 | 3/2008 | Joseph et al. |
| 7,389,923 B2 | 6/2008 | Blanford |
| 7,546,953 B1 | 6/2009 | Collins, Jr. |
| 7,644,865 B2 | 1/2010 | Barkan |
| 7,753,269 B2 | 7/2010 | Russell et al. |
| 8,245,926 B2 | 8/2012 | Guess et al. |
| 2003/0226893 A1 | 12/2003 | Okada et al. |
| 2006/0043187 A1* | 3/2006 | He et al. .................. 235/462.2 |
| 2006/0065732 A1 | 3/2006 | Barkan |
| 2006/0163360 A1 | 7/2006 | Steusloff et al. |
| 2006/0192010 A1 | 8/2006 | Massieu et al. |
| 2007/0034696 A1 | 2/2007 | Barkan et al. |
| 2007/0063048 A1* | 3/2007 | Havens et al. ........... 235/462.46 |
| 2007/0164115 A1* | 7/2007 | Joseph et al. ............ 235/462.21 |
| 2008/0054075 A1* | 3/2008 | Barkan ................... 235/462.01 |
| 2010/0019042 A1 | 1/2010 | Barkan |
| 2010/0108766 A1 | 5/2010 | Madej et al. |
| 2011/0309147 A1 | 12/2011 | Barkan et al. |
| 2012/0043385 A1 | 2/2012 | Trajkovic |
| 2012/0181338 A1 | 7/2012 | Gao |

OTHER PUBLICATIONS

Non Final Office Action mailed Aug. 1, 2011 in U.S. Appl. No. 12/290,797, Dariusz J. Madej, filed Nov. 4, 2008.
Final Office Action mailed Feb. 6, 2012 in U.S. Appl. No. 12/290,797, Dariusz J. Madej, filed Nov. 4, 2008.
Notice of Allowance mailed Mar. 23, 2012 in U.S. Appl. No. 12/290,797, Dariusz J. Madej, filed Nov. 4, 2008.
International Preliminary Report on Patentability for International Application No. PCT/US2009/061829 mailed on May 19, 2011.
Notice of Allowance mailed Sep. 20, 2012 in U.S. Appl. No. 12/290,797, Dariusz J. Madej, filed Nov. 4, 2008.
Parikh, D., and Jancke, G., "Localization and Segmentation of a 2D High Capacity Color Barcode," 7 pages.
Notice of Allowance mailed Oct. 3, 2013 in U.S. Appl. No. 12/290,797, Dariusz J. Madej, filed Nov. 4, 2008.
International Search Report dated Oct. 24, 2013 in related application PCT/US2013/055648.

* cited by examiner

IMAGE CAPTURE BASED ON WORKING DISTANCE RANGE RESTRICTION IN IMAGING READER

DESCRIPTION OF THE RELATED ART

Solid-state imaging systems or imaging readers have been used, in both handheld and/or hands-free modes of operation, to electro-optically read targets to be decoded, such as one-dimensional bar code symbols, particularly of the Universal Product Code (UPC) symbology having a row of symbol elements, e.g., bars and spaces, spaced apart and having width dimensions along a scan direction, as well as two-dimensional symbols, such as the Code 49 symbology having a plurality of vertically stacked rows of bar and space patterns in a single symbol, as described in U.S. Pat. No. 4,794,239, and even non-symbol targets to be imaged, such as documents, receipts and signatures.

The known imaging reader includes a housing either held by an operator and/or supported on a support surface, a window supported by the housing and aimed at the target, and an imaging engine or module supported by the housing and having a solid-state imager with a sensor array of photocells or light sensors that correspond to image elements or pixels, and an imaging lens assembly for capturing return light scattered and/or reflected from the target being imaged along an imaging axis through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or into a picture of a non-symbol target. Upon a successful decode or reading, an indicator, such as a beeper or an indicating light emitting diode (LED), is energized.

It is therefore known to use the imager for capturing a monochrome image of a target or symbol as, for example, disclosed in U.S. Pat. No. 5,703,349. It is also known to use the imager with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the sensor array, especially in dimly lit environments and/or at far range imaging and reading, the known imaging module may also have an illuminating light assembly for illuminating the target with illumination light from an illuminating light source, e.g., one or more light emitting diodes (LEDs) and illuminating lenses, for reflection and scattering therefrom. The known imaging module may also have an aiming light assembly for projecting an aiming light pattern or mark, such as a "crosshair" pattern, with aiming light from an aiming light source, e.g., an aiming laser or one or more LEDs, through aiming lenses on the target prior to imaging. The operator aims the aiming pattern on the target to be imaged during an aiming mode prior to imaging and reading.

In the hands-free mode, the operator may slide or swipe a product bearing the target past the window in either horizontal and/or vertical and/or diagonal directions in a "swipe" mode. Alternatively, the operator may present the target on the product to an approximate central region of the window in a "presentation" mode. The choice depends on operator preference or on the layout of a workstation in which the reader is used.

In the handheld mode, the operator holds the reader in his or her hand and initially aims the reader at the target to be imaged. The operator may first lift the reader from a countertop or a support stand or cradle. Once reading is completed, the operator may return the reader to the countertop or to the support stand to resume hands-free operation. A mode switch is typically provided on the reader and/or on the support stand to configure the reader in the appropriate handheld or hands-free mode.

Although the known imaging reader is generally satisfactory for its intended purpose, one concern relates to the range of working distances in which the target can be successfully imaged and read. For the handheld mode to be effective, the working distance range is typically designed to be long, for instance, many feet from the window. A long working distance range enables the operator to read a target located on a product that is either far from the handheld reader, for instance, on a remote shelf, or is either too big, or too heavy, or too inconvenient to be brought to the handheld reader.

However, if such a reader with a long working distance range is placed on a countertop or on a support stand for hands-free operation, then the reader can unintentionally read targets on products that happen to be in the field of view. For example, it is not uncommon for a consumer to simultaneously dump many products to be purchased on a countertop in a retail point-of-sale environment, in which event, the reader will at least try to read the targets on all those products scattered around the countertop. Worse yet, the operator will not know which of the targets have been read.

In addition, the programmed microprocessor is either constantly or cyclically running in the hands-free mode of operation and attempting to decode and process anything in the field of view of the reader. This not only wastes processing time, but also increases the processing burden on the microprocessor, which is also tasked with controlling operation of all the electrical components and electronic circuitry in the reader. It would therefore be desirable to limit the long working distance range in such readers in the hands-free mode of operation to ease the burden on the microprocessor so that it is only attempting to process targets when they are in a restricted working distance range of interest.

It is also common in a retail point-of-sale environment to disable electronic article surveillance (EAS) tags or radio frequency identification (RFID) tags associated with products being purchased. If EAS and RFID disabling circuitry is mounted on the reader, then such disabling circuitry is more effective at close range relative to the reader. Limiting the working distance range for image capture purposes, as described above, would also be beneficial for reliable operation of any such EAS and RFID disabling circuitry.

It is also known how to restrict the working distance range of imaging readers by analyzing various optical characteristics of a decoded bar code symbol. For example, the contrast characteristic or the modulation transfer function of a ratio of the brightness differences of adjacent bar code symbol elements of a decoded symbol for a given symbol density can be analyzed. Also, the number of pixels per module, i.e., the narrowest width element of the symbol, for a given symbol density can be measured. These techniques, however, require not only that the density of the symbol must be known, but also, that the target symbol must first be decoded. The symbol density might not be known in advance, and the burden on the microprocessor is not eased.

It is also known in U.S. Pat. No. 7,303,131 and U.S. Pat. No. 7,347,371 how to calibrate and analyze the position of an aiming pattern in a target image being captured. This analysis was solely used for the purpose of adjusting the focal length of the imaging lens assembly by moving an imaging lens, and also for adjusting the intensity of the aiming pattern.

SUMMARY OF THE INVENTION

The present invention relates to an arrangement for electro-optically reading a target, such as a bar code symbol particularly of the Universal Product Code (UPC) type, by image capture, which comprises a housing, an aiming assembly for projecting an aiming light pattern on the target that is located within a range of working distances relative to the housing, and an imaging assembly for capturing an image of the target and of the aiming light pattern over a field of view, and for generating an electrical signal indicative of the captured image. In accordance with one aspect of this invention, a programmed microprocessor or controller is operative for determining a distance of the target relative to the housing based on a position of the aiming light pattern in the captured image, and for processing the electrical signal into information relating to the target when the target lies in a restricted zone within the range of working distances.

The imaging assembly advantageously includes a solid-state imager having an array of image sensors, preferably, a CCD or a CMOS array, and at least one imaging lens for focusing the captured image onto the array. A memory is preferably accessible by the controller, for storing a known set of distances that define the restricted zone. By way of non-limiting example, the restricted zone may be configured to lie between a window supported by the housing and a working distance of about five inches from the window.

The controller is operative for determining the target distance during a ranging frame, and for processing the electrical signal into the target information during a decode frame that occurs at a different time than the ranging frame. One or more decode frames can alternate with one or more ranging frames in any desired timing sequence. Preferably, the controller can operate at multiple frames per second. In one embodiment, a ranging frame occurs subsequently to a decode frame, in which case, the controller is operative for accepting the processed electrical signal during the prior decode frame if the target distance determined during the subsequent ranging frame is within the restricted zone. In another embodiment, the ranging frame occurs prior to the decode frame, in which case, the controller is operative for accepting the processed electrical signal during the subsequent decode frame if the target distance determined during the prior ranging frame is within the restricted zone. In this latter embodiment, if the determined target distance is outside the restricted zone, then the decode frame can be disregarded, and the controller can keep determining the target distance until the determined target distance falls within the desired restricted zone.

In accordance with another aspect of this invention, a method of electro-optically reading a target by image capture is performed by projecting an aiming light pattern on the target that is located within a range of working distances relative to a housing, capturing an image of the target and of the aiming light pattern over a field of view, generating an electrical signal indicative of the captured image, determining a distance of the target relative to the housing based on a position of the aiming light pattern in the captured image, and processing the electrical signal into information relating to the target when the target lies in a restricted zone within the range of working distances.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
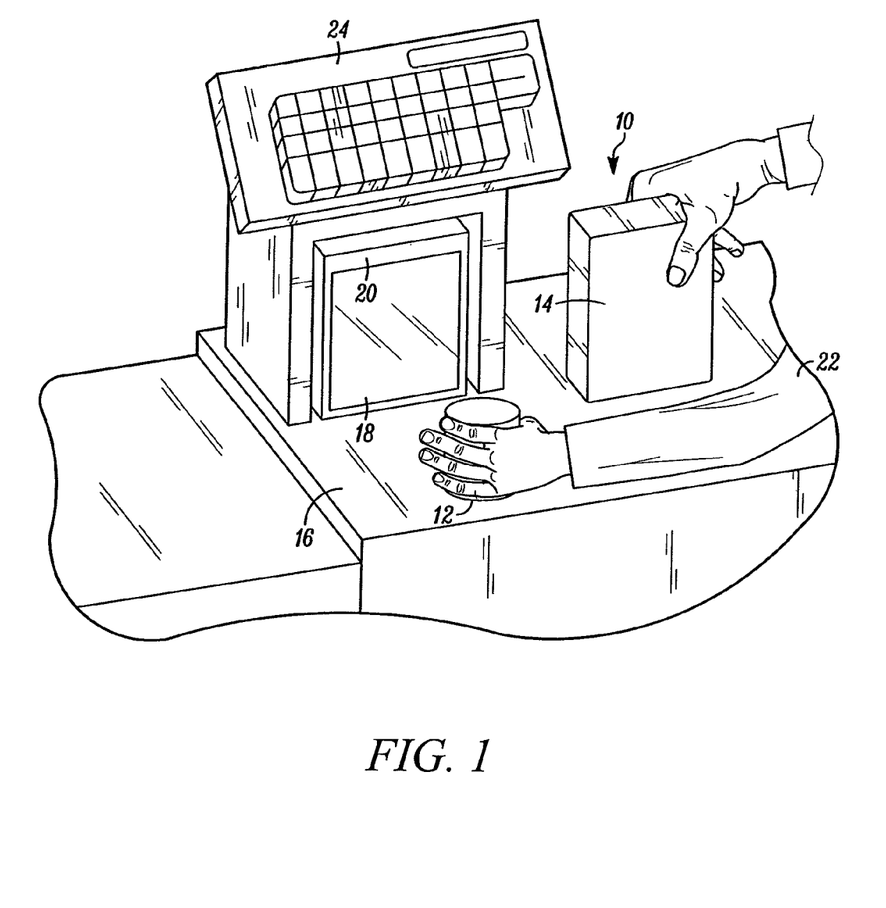
FIG. 1 is a perspective view of an imaging reader operative in a hands-free mode for capturing light from targets to be electro-optically read.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past, or presented to, a generally vertical or upright planar window 18 of a portable, box-shaped, vertical slot reader or imaging reader 20 mounted on the countertop 16. A checkout clerk or operator 22 is located at one side of the countertop, and the imaging reader 20 is located at the opposite side. A host or cash/credit register 24 is located within easy reach of the operator. The operator 22 can also hold the imaging reader 20 in one's hand during imaging.

Figure 2:
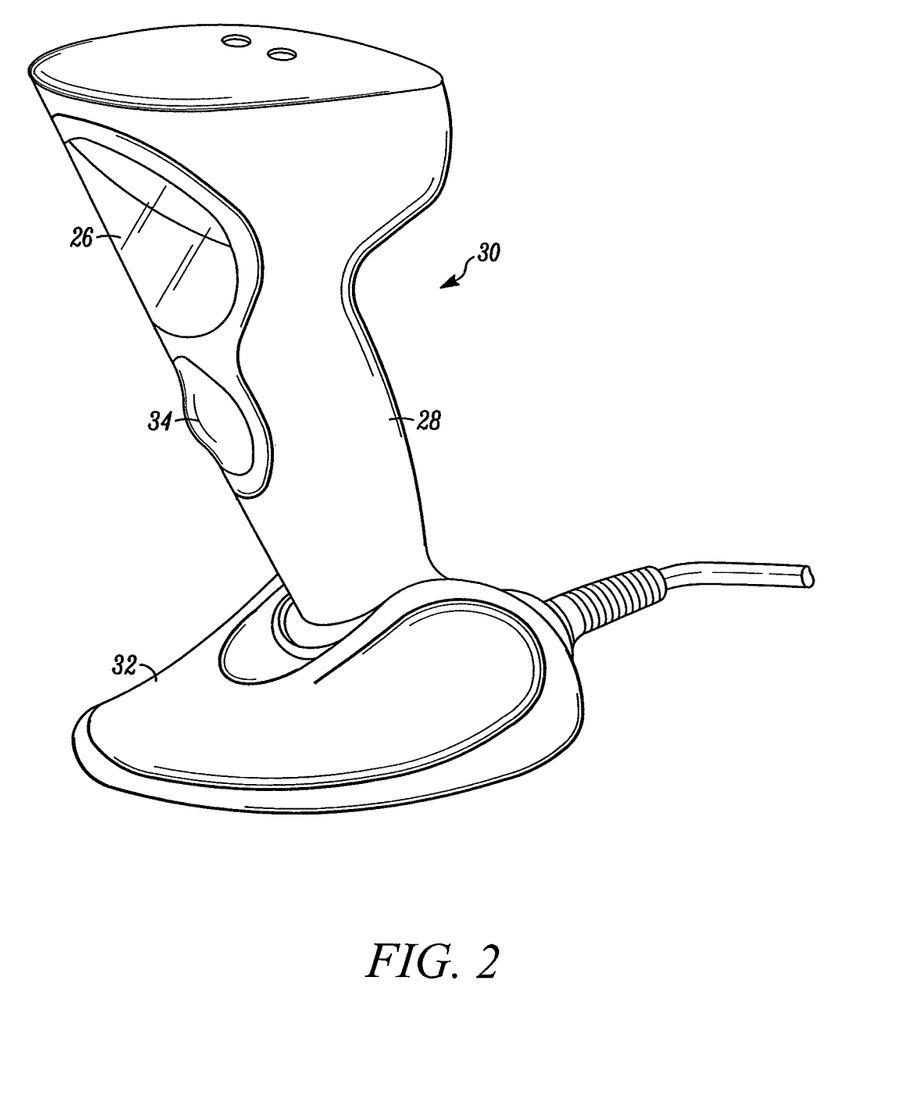
FIG. 2 is a perspective view of another imaging reader operative in either a hand-held mode, or a hands-free mode, for capturing light from targets to be electro-optically read.

Reference numeral 30 in FIG. 2 generally identifies another imaging reader having a different configuration from that of imaging reader 20. Imaging reader 30 also has a generally vertical or upright window 26 and a gun-shaped housing 28 supported by a base 32 for supporting the imaging reader 30 on a countertop. The imaging reader 30 can thus be used as a stationary workstation in which products are slid or swiped past, or presented to, the vertical window 26, or can be picked up off the countertop and held in the operator's hand and used as a handheld imaging reader in which a trigger 34 is manually depressed to initiate imaging of a target. In another variation, the base 32 can be omitted.

Figure 3:
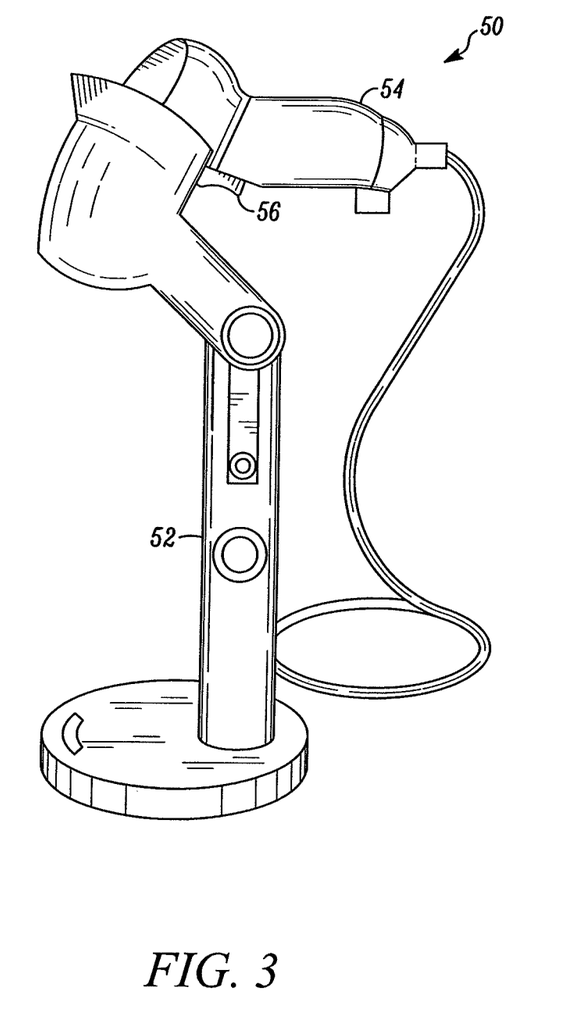
FIG. 3 is a perspective view of still another imaging reader operative in either a hand-held mode, or a hands-free mode, for capturing light from targets to be electro-optically read.

Reference numeral 50 in FIG. 3 generally identifies another portable, electro-optical imaging reader having yet another operational configuration from that of imaging readers 20, 30. Reader 50 has a window and a gun-shaped housing 54 and is shown supported in a workstation mode by a stand 52 on a countertop. The reader 50 can thus be used as a stationary workstation in which products are slid or swiped past, or presented to, its window, or can be picked up off the stand and held in the operator's hand in a handheld mode and used as a handheld system in which a trigger 56 is manually depressed to initiate reading of the symbol.

Figure 4:
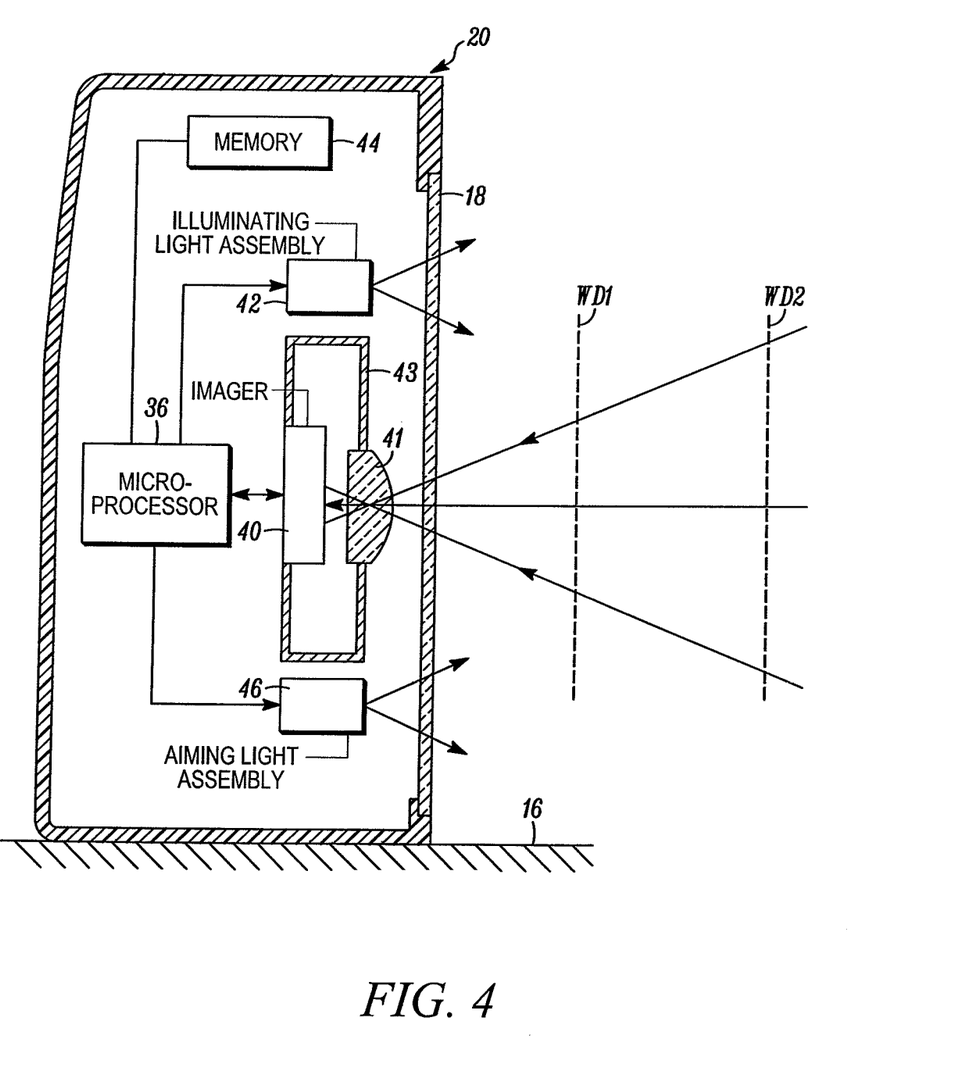
FIG. 4 is a schematic diagram of various components of the reader of FIG. 1 in accordance with the present invention.

Each reader 20, 30, 50 includes, as shown for representative reader 20 in FIG. 4, an imaging assembly including an imager 40 and at least one focusing lens 41 that are mounted in a chassis 43 mounted within a housing of the reader. The imager 40 is a solid-state device, for example, a CCD or a CMOS imager and has a linear or area array of addressable image sensors or pixels operative for capturing light through the window 18 from a target, for example, a one-dimensional UPC symbol over a field of view and located in a working range of distances, such as close-in working distance (WD1) and far-out working distance (WD2) relative to the window 18. In a preferred embodiment, WD1 is about five inches away from the window 18, and WD2 is about twelve inches away from the window 18. Other numerical values for these distances are contemplated by this invention.

An illuminating light assembly 42 is also mounted in the housing of the imaging reader and preferably includes a plurality of illuminating light sources, e.g., light emitting diodes (LEDs) and illuminating lenses arranged to uniformly illuminate the target with illumination light. An aiming light assembly 46 is also mounted in the housing and is operative for projecting an aiming light pattern or mark, such as a "crosshair" pattern, with aiming light from an aiming light source, e.g., an aiming laser or one or more LEDs, through aiming lenses on the target. The operator aims the aiming pattern on the target to be imaged. As shown in FIG. 4, the imager 40, the illuminating LEDs of the illuminating assembly 42, and the aiming light source of the aiming light assembly 46 are operatively connected to a controller or programmed microprocessor 36 operative for controlling the operation of these components. Preferably, the microprocessor 36 is the same as the one used for decoding return light scattered from the target and/or for processing the captured target images.

In operation, the microprocessor 36 sends command signals to energize the aiming light source to project the aiming light pattern on the target, to energize the illuminating LEDs 42 for a short time period, say 500 microseconds or less to illuminate the target, and also to energize the imager 40 to collect light from the target only during said time period. A typical array needs about 16 to 33 milliseconds to acquire the entire target image and operates at a frame rate of about 30 to 60 frames per second. The array may have on the order of one million addressable image sensors.

In accordance with one aspect of this invention, the microprocessor 36 is operative for determining a distance of the target relative to the housing based on a position of the aiming light pattern in the captured image during a ranging frame, and for processing the electrical signal into information relating to the target when the target lies in a restricted zone within the range of working distances during a decode frame that occurs at a different time than the ranging frame. As described below, one or more decode frames can alternate with one or more ranging frames in any desired timing sequence. The restricted zone is preferably configured as the near zone between the window and WD1. Symbols located beyond WD1, as described below, are not read. A memory 44 is accessible by the microprocessor 36, for storing a known set of working distances that define the restricted zone.

The determination of the distance of the target relative to the housing based on the position of the aiming light pattern in the captured image is performed as described in U.S. Pat. No. 7,303,131 and U.S. Pat. No. 7,347,371, the entire contents of said patents being incorporated herein by reference thereto.

Figure 5:
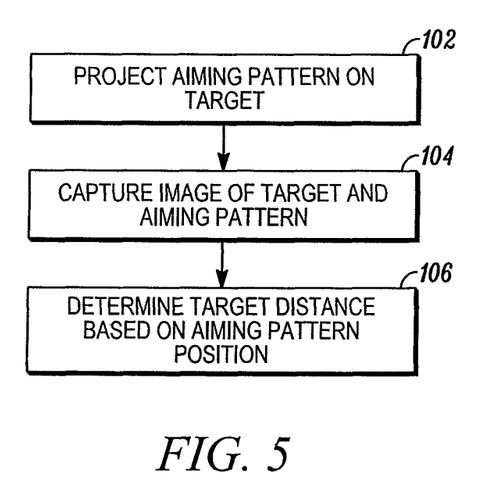
FIG. 5 is a flow chart depicting steps performed during a ranging frame in accordance with a method of the present invention.

FIG. 5 depicts the actions that are performed during the ranging frame. The aiming light pattern is projected onto the target by having the microprocessor 36 energize the aiming light source in step 102. The entire image of the target and of the aiming pattern is captured by having the microprocessor 36 energize the imager 40 in step 104. The determination of the distance of the target relative to the housing based on the position of the aiming light pattern in the captured image is performed by the microprocessor 36 in step 106.

Figure 6:
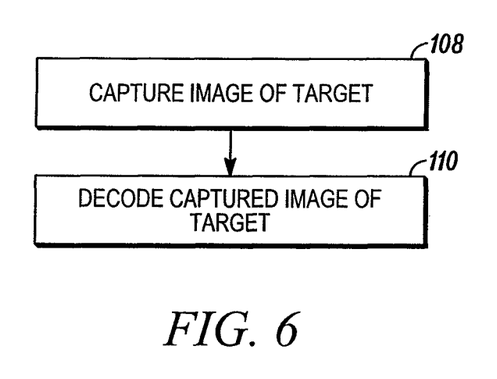
FIG. 6 is a flow chart depicting steps performed during a decode frame in accordance with the method of the present invention.

FIG. 6 depicts the actions that are performed during the decode frame. The image of the target is captured by having the microprocessor 36 energize the imager 40 in step 108. The captured image of the target is decoded and/or processed by the microprocessor 36 in step 110.

Figure 7:
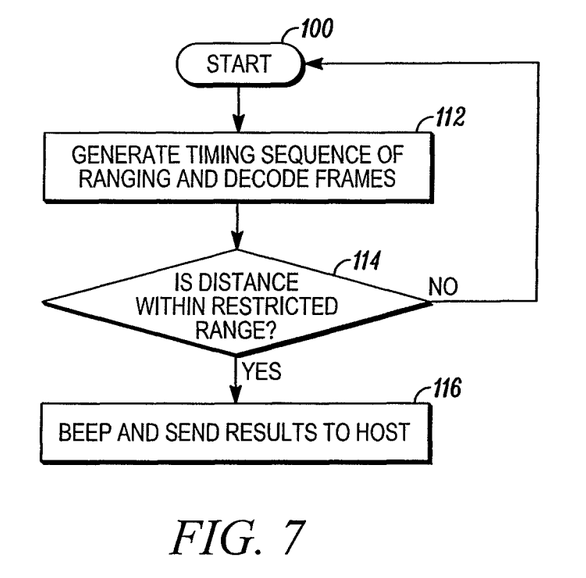
FIG. 7 is a flow chart depicting operation of the method in accordance with the present invention.

FIG. 7 depicts the overall actions that are performed in the method of this invention. Starting from start step 100, the microprocessor 36 generates a timing sequence of the aforementioned ranging and decode frames in step 112. One or more decode frames can alternate with one or more ranging frames in any desired timing sequence. By way of non-limiting examples, each ranging frame can alternate with each decode frame, or each ranging frame can occur after every two successive decode frames. Then, the microprocessor 36 accesses the memory 44 and determines whether the target distance is within the restricted range in step 114. If the determined target distance is within the restricted range, then the controller 36 accepts the decoded and/or processed target, indicates a successful read, and sends the result to a remote host for further processing at step 116. If the determined target distance is not within the restricted range, then the controller 36 rejects the decoded symbol and returns to the start block 100 to await another target or another attempt to read the same target.

In one embodiment, when a ranging frame occurs subsequently to a decode frame, the microprocessor 36 is programmed to accept the processed electrical signal during the prior last decode frame by assuming that the target distance determined during the subsequent ranging frame still applies. In another embodiment, when the ranging frame occurs prior to the decode frame, the microprocessor 36 is programmed to accept the processed electrical signal during the next subsequent decode frame, and to discard all previously processed electrical signals, thereby expending processing time only on the frame of interest. In this latter embodiment, if the determined target distance is outside the restricted zone, then the decode frame can be disregarded, and the microprocessor 36 can keep determining the target distance until the determined target distance falls within the desired restricted zone.

It will be understood that each of the elements described above, or two or more together, also may find a useful application in other types of constructions differing from the types described above. Thus, imaging systems having different configurations can be used. Also, symbologies other than UPC symbols can be used as targets. Restricted zones of different numerical ranges could be employed.

While the invention has been illustrated and described in connection with selective working distance range restriction in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for electro-optically reading a target by image capture, comprising:
    a housing;
    an aiming assembly for projecting an aiming light pattern on the target that is located within a range of working distances relative to the housing;
    an imaging assembly for capturing an image of the target and of the aiming light pattern over a field of view, and for generating an electrical signal indicative of the captured image;
    a controller for determining a distance of the target relative to the housing based on a position of the aiming light pattern in the captured image, and for processing the electrical signal to decode captured image of the target when the target lies in a restricted zone within the range of working distances and rejecting any decoding of the captured image of the target when the target lies outside the restricted zone; and
    wherein the controller is operative for determining the target distance based on a position of the aiming light pattern in an image captured during a ranging frame, for processing the electrical signal to decode captured image of the target during a decode frame, and for generating a timing sequence of one or more decode frames for capturing images alternating with at least one ranging frame for capturing the image with the aiming light pattern to determine the target distance, the timing sequence including at least one decode frame that occurs prior to the at least one ranging frame for capturing the image with the aiming light pattern to determine the target distance and at least one decode frame that occurs subsequently to the at least one ranging frame for capturing the image with the aiming light pattern to determine the target distance.

2. The arrangement of claim 1, wherein the imaging assembly includes a solid-state imager having an array of image sensors, and an imaging lens for focusing the captured image onto the array.

3. The arrangement of claim 1, and a memory accessible by the controller, for storing a known set of distances that define the restricted zone.

4. The arrangement of claim 1, and a window supported by the housing, and wherein the restricted zone lies between the window and a working distance of five inches from the window.

5. The arrangement of claim 1, wherein the controller is operative for accepting the processed electrical signal during the at least one decode frame that occurs prior to the at least one ranging frame if the target distance determined during the at least one ranging frame is within the restricted zone.

6. The arrangement of claim 1, wherein the controller is operative for accepting the processed electrical signal during at least one decode frame that occurs subsequently to the at least one ranging frame if the target distance determined during the at least one ranging frame is within the restricted zone.

7. An arrangement for electro-optically reading a target by image capture, comprising:
    a housing;
    means for projecting an aiming light pattern on the target that is located within a range of working distances relative to the housing;
    means for capturing an image of the target and of the aiming light pattern over a field of view, and for generating an electrical signal indicative of the captured image; and
    control means for determining a distance of the target relative to the housing based on a position of the aiming light pattern in the captured image, for processing the electrical signal to decode captured image of the target when the target lies in a restricted zone within the range of working distances and rejecting any decoding of the captured image of the target when the target lies outside the restricted zone, for determining the target distance based on a position of the aiming light pattern in an image captured during a ranging frame, for processing the electrical signal to decode captured image of the target during a decode frame, and for generating a timing sequence of one or more decode frames for capturing images alternating with at least one ranging frame for capturing the image with the aiming light pattern to determine the target distance, the timing sequence including at least one decode frame that occurs prior to the at least one ranging frame for capturing the image with the aiming light pattern to determine the target distance and at least one decode frame that occurs subsequently to the at least one ranging frame for capturing the image with the aiming light pattern to determine the target distance.

8. The arrangement of claim 7, wherein the control means is operative for accepting the processed electrical signal during the at least one decode frame that occurs prior to the at least one ranging frame if the target distance determined during the at least one ranging frame is within the restricted zone.

9. The arrangement of claim 7, wherein the control means is operative for accepting the processed electrical signal during at least one decode frame that occurs subsequently to the at least one ranging frame if the target distance determined during the at least one ranging frame is within the restricted zone.

10. A method of electro-optically reading a target by image capture, comprising the steps of:
    projecting an aiming light pattern on the target that is located within a range of working distances relative to a housing;
    capturing an image of the target and of the aiming light pattern over a field of view, and generating an electrical signal indicative of the captured image;
    determining a distance of the target relative to the housing based on a position of the aiming light pattern in the captured image during a ranging frame, and processing the electrical signal to decode captured image of the target when the target lies in a restricted zone within the range of working distances and rejecting any decoding of the captured image of the target when the target lies outside the restricted zone;
    generating a timing sequence of one or more decode frames for capturing images alternating with at least one ranging frame for capturing the image with the aiming light pattern to determine the target distance, the timing sequence including at least one decode frame that occurs prior to the at least one ranging frame for capturing the image with the aiming light pattern to determine the target distance and at least one decode frame that occurs subsequently to the at least one ranging frame for capturing the image with the aiming light pattern to determine the target distance; and determining the target distance during the at least one ranging frame, and processing the electrical signal to decode captured image of the target during one of the decode frames.

11. The method of claim 10, wherein the capturing step is performed by a solid-state imager having an array of image sensors, and by an imaging lens that focuses the captured image onto the array.

12. The method of claim 10, and storing a known set of distances that define the restricted zone in a memory.

13. The method of claim 10, and supporting a window by the housing, and configuring the restricted zone to lie between the window and a working distance of five inches from the window.

14. The method of claim 10, accepting the processed electrical signal during the at least one decode frame that occurs prior to the at least one ranging frame if the target distance determined during the at least one ranging frame is within the restricted zone.

15. The method of claim 10, accepting the processed electrical signal during at least one decode frame that occurs subsequently to the at least one ranging frame if the target distance determined during the at least one ranging frame is within the restricted zone.

16. The arrangement of claim 1, wherein the timing sequence includes two decode frames that occurs prior to the at least one ranging frame and two decode frames that occurs subsequently to the at least one ranging frame.

17. The method of claim 10, wherein the timing sequence includes two decode frames that occurs prior to the at least one ranging frame and two decode frames that occurs subsequently to the at least one ranging frame.

* * * * *